US012551756B2

(12) United States Patent
Jolliffe et al.

(10) Patent No.: US 12,551,756 B2
(45) Date of Patent: Feb. 17, 2026

(54) COMMUNICATION SYSTEM

(71) Applicant: World Golf Systems Limited, Watford (GB)

(72) Inventors: David Jolliffe, Watford (GB); Mark Miller, Watford (GB)

( * ) Notice: Subject to any disclaimer, the term of this patent is extended or adjusted under 35 U.S.C. 154(b) by 0 days.

(21) Appl. No.: 18/025,765

(22) PCT Filed: Sep. 10, 2021

(86) PCT No.: PCT/GB2021/052343
§ 371 (c)(1),
(2) Date: Mar. 10, 2023

(87) PCT Pub. No.: WO2022/053814
PCT Pub. Date: Mar. 17, 2022

(65) Prior Publication Data

US 2023/0364470 A1 Nov. 16, 2023

(30) Foreign Application Priority Data

Sep. 10, 2020 (GB) ...................................... 2014253

(51) Int. Cl.
*A63B 69/36* (2006.01)
*A63B 24/00* (2006.01)
(Continued)

(52) U.S. Cl.
CPC ...... *A63B 24/0021* (2013.01); *A63B 37/0003* (2013.01); *A63B 57/10* (2015.10);
(Continued)

(58) Field of Classification Search
CPC ............ A63B 24/0021; A63B 24/0028; A63B 2024/0031; A63B 2024/0034; A63B 2024/0053; A63B 69/3614
See application file for complete search history.

(56) References Cited

U.S. PATENT DOCUMENTS 5,324,028 A * 6/1994 Luna ...................... A63B 69/36 473/409
5,728,006 A * 3/1998 Teitell ................ A63B 69/3614 473/151
(Continued)

FOREIGN PATENT DOCUMENTS

CN 103518408 A 1/2014
CN 106466518 A 3/2017
(Continued)

OTHER PUBLICATIONS

International Preliminary Report on Patentability for International Application No. PCT/GB2021/052343 dated Mar. 7, 2023.
(Continued)

*Primary Examiner* — Alvin A Hunter
(74) *Attorney, Agent, or Firm* — Neal, Gerber & Eisenberg LLP

(57) ABSTRACT

To communicate with a magnetometer (82) within a golf ball (20) used in a golf facility, an electromagnetic coil (30) is configured to supply pulsed signals to the magnetometer. A plurality of coils (30) are provided at different locations around the golf facility, and the pulsed signals are preferably coded so that the location of the golf ball is known.

18 Claims, 5 Drawing Sheets

(51) Int. Cl.
*A63B 37/00* (2006.01)
*A63B 57/10* (2015.01)
*H04B 5/26* (2024.01)

(52) U.S. Cl.
CPC ........ *H04B 5/26* (2024.01); *A63B 2024/0031* (2013.01); *A63B 2209/08* (2013.01); *A63B 2220/833* (2013.01); *A63B 2225/50* (2013.01)

(56) References Cited

U.S. PATENT DOCUMENTS

| | | | | |
|---|---|---|---|---|
| 5,820,484 | A * | 10/1998 | Terry | A63B 37/0003 473/356 |
| 5,826,874 | A * | 10/1998 | Teitell | A63B 69/3614 473/225 |
| 6,620,057 | B1 * | 9/2003 | Pirritano | G01S 13/75 342/51 |
| 7,166,037 | B2 * | 1/2007 | Carter | A63B 57/10 473/165 |
| 7,416,493 | B2 * | 8/2008 | Carter | A63B 69/3655 473/165 |
| 7,682,265 | B2 * | 3/2010 | VanDelden | A63B 53/047 473/351 |
| 7,731,602 | B2 * | 6/2010 | Cage | G01S 15/88 434/3 |
| 7,736,242 | B2 * | 6/2010 | Stites | A63B 69/3614 473/223 |
| 7,976,407 | B2 * | 7/2011 | VanDelden | A63B 53/0466 473/354 |
| 8,460,127 | B2 * | 6/2013 | Kumar | A63B 57/10 473/387 |
| 8,617,006 | B2 * | 12/2013 | VanDelden | A63B 60/00 473/409 |
| 8,864,599 | B2 * | 10/2014 | Wright | A63B 69/3632 473/409 |
| 8,913,955 | B1 | 12/2014 | Mincher | |
| 8,968,100 | B2 * | 3/2015 | Hohteri | A63B 69/0071 342/42 |
| 9,248,354 | B2 * | 2/2016 | Duncan | A63B 69/0075 |
| 9,254,427 | B2 * | 2/2016 | Duncan | A63B 69/0075 |
| 9,320,951 | B2 * | 4/2016 | Duncan | A63B 69/0075 |
| 9,351,106 | B2 | 5/2016 | Markham et al. | |
| 9,486,669 | B2 * | 11/2016 | Niegowski | A63B 24/0021 |
| 9,504,895 | B2 * | 11/2016 | Davenport | A63B 69/3614 |
| 10,220,286 | B2 * | 3/2019 | Thurman | A63B 37/0056 |
| 10,432,261 | B2 | 10/2019 | Austad | |
| 10,493,329 | B1 | 12/2019 | Luciano et al. | |
| 10,716,971 | B1 * | 7/2020 | Oberc | A63B 69/36 |
| 11,083,953 | B2 * | 8/2021 | Hermandorfer | G06T 11/60 |
| 11,344,784 | B1 * | 5/2022 | Dykhuis | A63B 37/0076 |
| 11,724,172 | B2 | 8/2023 | Jolliffe et al. | |
| 11,844,981 | B2 * | 12/2023 | Korpach | A63F 13/21 |
| 11,872,461 | B1 * | 1/2024 | Dykhuis | A63B 37/0039 |
| 11,875,517 | B2 * | 1/2024 | DeLeon | G06T 7/80 |
| 2002/0098913 | A1 | 7/2002 | Goldman | |
| 2003/0228934 | A1 | 12/2003 | Corzilius et al. | |
| 2008/0088303 | A1 | 4/2008 | Englert | |
| 2010/0285903 | A1 | 11/2010 | Nicodem | |
| 2012/0329387 | A1 | 12/2012 | Joseph | |
| 2015/0072811 | A1 | 3/2015 | Jolliffe et al. | |
| 2016/0346671 | A1 | 12/2016 | Jarchafjian et al. | |
| 2018/0040954 | A1 | 2/2018 | Richardson et al. | |
| 2018/0200601 | A1 | 7/2018 | Jolliffe et al. | |
| 2018/0236303 | A1 | 8/2018 | Mathar et al. | |
| 2018/0369647 | A1 | 12/2018 | Jolliffe et al. | |

FOREIGN PATENT DOCUMENTS

| | | | | | |
|---|---|---|---|---|---|
| CN | 107690642 | A | | 2/2018 | |
| CN | 107921310 | A | | 4/2018 | |
| CN | 108025204 | A | | 5/2018 | |
| CN | 109011489 | A | | 12/2018 | |
| EP | 3304392 | A1 | | 4/2018 | |
| JP | 08206266 | A | | 8/1996 | |
| JP | 09239088 | A | * | 9/1997 | |
| JP | 2016058895 | A | | 4/2016 | |
| WO | 2005028035 | A1 | | 3/2005 | |
| WO | WO-2013156778 | A1 | * | 10/2013 | A63B 43/00 |

OTHER PUBLICATIONS

International Search Report for International Application No. PCT/GB2021/052343 dated Jan. 26, 2022.

Search Report for GB Application No. GB2014253.5 dated Mar. 11, 2021.

“First Office Action”, From Corresponding Chinese Patent Application No. 202180055223.6, (21 pages), Mar. 29, 2024.

“Second Office Action”, From Corresponding Chinese Patent Application No. 202180055223.6 (12 pages), Oct. 30, 2024.

Communication Pursuant to Article 94(3) EPC dated Jul. 10, 2025 from Corresponding European Patent Application No. 21794902.3 (6 Pages).

Notification on Decision of Rejection for Corresponding Chinese Patent Application No. 202180055223.6 dated Apr. 16, 2025 (12 Pages).

Office Action for Corresponding Japanese Patent Application No. 2023-515588 dated Jul. 22, 2025 (4 Pages).

First Substantive Examination Report dated Aug. 20, 2025 for United Arab Emirates Patent Application No. P6000547/2023 (8 Pages).

Written Opinion dated Sep. 25, 2025 for Singapore Patent Application No. 11202301762U (5 Pages).

* cited by examiner

| PREAMBLE | | | | | | BRK | | DATA0 | | | | BRK | | DATA1 | | | | BRK | | DATA2 | | | | BRK | | CHK | | | | EOF | |
|---|---|---|---|---|---|---|---|---|---|---|---|---|---|---|---|---|---|---|---|---|---|---|---|---|---|---|---|---|---|---|---|
| 0 | 1 | 0 | 1 | 0 | 1 | 0 | 0 | x | x | x | x | 0 | 0 | x | x | x | x | 0 | 0 | x | x | x | x | 0 | 0 | x | x | x | x | 1 | 1 |

| PREAMBLE | | | | | | BRK | | DATA0 | | | | BRK | | DATA1 | | | | BRK | | DATA2 | | | | BRK | | CHK | | | | EOF | |
|---|---|---|---|---|---|---|---|---|---|---|---|---|---|---|---|---|---|---|---|---|---|---|---|---|---|---|---|---|---|---|---|
| 0 | 1 | 0 | 1 | 0 | 1 | 0 | 0 | | | | | 0 | 0 | | | | | 0 | 0 | | | | | 0 | 0 | | | | | 1 | 1 |

| PREAMBLE | | | | | | BRK | | DATA0 | | | | BRK | | DATA1 | | | | BRK | | DATA2 | | | | BRK | | CHK | | | | EOF | |
|---|---|---|---|---|---|---|---|---|---|---|---|---|---|---|---|---|---|---|---|---|---|---|---|---|---|---|---|---|---|---|---|
| 1 | 0 | 1 | 0 | 1 | 0 | 1 | 1 | | | | | 1 | 1 | | | | | 1 | 1 | | | | | 1 | 1 | | | | | 0 | 0 |

COMMUNICATION SYSTEM

CROSS-REFERENCE TO RELATED APPLICATIONS

This is a national stage patent application of PCT/GB2021/052343, filed on Sep. 10, 2021 entitled "COMMUNICATION SYSTEM" and claims priority from Great Britain Patent Application No. 2014253.5, filed Sep. 10, 2020, both of which are incorporated by reference in their entirety.

The present invention relates to a system and a method for establishing a communication with objects, in particular coded objects and, more particularly golf balls, especially coded golf balls.

It is known, e.g. from WO 2017/006133, to incorporate a magnetic switch in a coded golf ball facility such as disclosed in WO 2013/156778. To activate the switch at desired locations, one or more permanent magnets may be installed, e.g. at a battery charger for a battery within a ball. In such installations, however, it is possible for stray magnetic fields (e.g. from adjacent holes in a golf facility) to interfere with correct operation of the switch and/or other communications with a golf ball. The widespread use of mobile phones can also interfere with correct operation.

Aspects of the present invention seek to overcome or at least reduce the above problem.

According to a first aspect of the present invention there is provided a system for establishing a communication with an object comprising a magnetic field detecting device, the system including an electromagnetic coil and associated circuitry configured to supply electrical signals to the coil to generate a changing magnetic field, and means for positioning the object in juxtaposition to the coil, whereby changes in the magnetic field can be detected by the detecting device of the object.

Detection of the magnetic field changes by the device preferably activates a switching arrangement in the object which may itself activate circuitry within the object.

Magnetic field detection in embodiments of the present invention should be distinguished from radio wave detection which involves the detection of electromagnetic waves.

For example, where the object is a golf ball which has internal circuitry and an associated antenna for radio communications (e.g. via Bluetooth) with a control system within a golf facility, detection of the magnetic field may enable these communications. In one example, the ball's communication circuitry may be completely switched off before detection of the field. In preferred arrangements, however, the circuitry within the ball is switched from a low-power (or "whispering") state to a high-power (or "shouting") state.

The magnetic detection device is preferably a magnetometer, in particular a 3-axis magnetometer with three magnetic field directions (x, y and z). The magnetometer is preferably part of a 9-axis accelerator device, which also includes a gyroscope.

Detection of the magnetic field produced by the coil provides a more secure arrangement for activating the ball's communication circuitry, being less susceptible to undesired actuation from other sources. In preferred arrangements, however, the coil produces pulsed signals and in particular coded pulsed signals. This not only provides an even more secure arrangement but, where the arrangement is one of a plurality of similar arrangements, enables the ball or other object to detect the particular system to which it is adjacent. Thus, for example, in a golf facility with nine or more holes, each tee may have a respective coil delivering its own coded pulse train, so that when placed on a tee, a ball "knows" on which tee it is situated.

The system preferably includes a radio signal receiver for communication with a radio signal transmitter in a positioned object. Preferably, the radio signal receiver is configured to receive signals including an identification code of the object.

The object is preferably a golf ball which is used in a golf facility comprising a plurality of systems of the above-mentioned type and a plurality of golf balls, the systems being arranged at or near one or more of a tee, a ball dispenser, a hazard feature, a battery charger for respective batteries within the balls, a drop zone, and a cup or other receiver forming a hole.

The golf balls preferably each have a unique identification code which is arranged to be transmitted by a radio signal to a respective system at which it is positioned.

According to a second aspect of the present invention, there is provided a method of establishing a communication between a system and an object which comprises a magnetometer, the system comprising an electromagnetic coil, the method comprising the step of supplying electrical signals to the coil to generate a changing magnetic field and detecting the changing magnetic field with the magnetometer.

The electrical signals and the magnetic field changes are preferably pulsed. In addition, they are preferably coded.

In preferred arrangements, the magnetometer is connected to a switching arrangement and establishment of the communication activates a switching function of the switching arrangement.

According to a third aspect of the present invention, there is provided a combination of a magnetometer connected to a switching arrangement and an electromagnetic coil which is connected to receive signals from a signalling arrangement and which is arranged to generate a corresponding changing magnetic field, wherein the signalling arrangement is configured to cause the coil to transmit an encoded message and the magnetometer is configured, upon detection of the encoded message, to activate the switching arrangement.

A preferred embodiment of the present invention will now be described, by way of example only, with reference to the accompanying drawings, of which:

Figure 1:
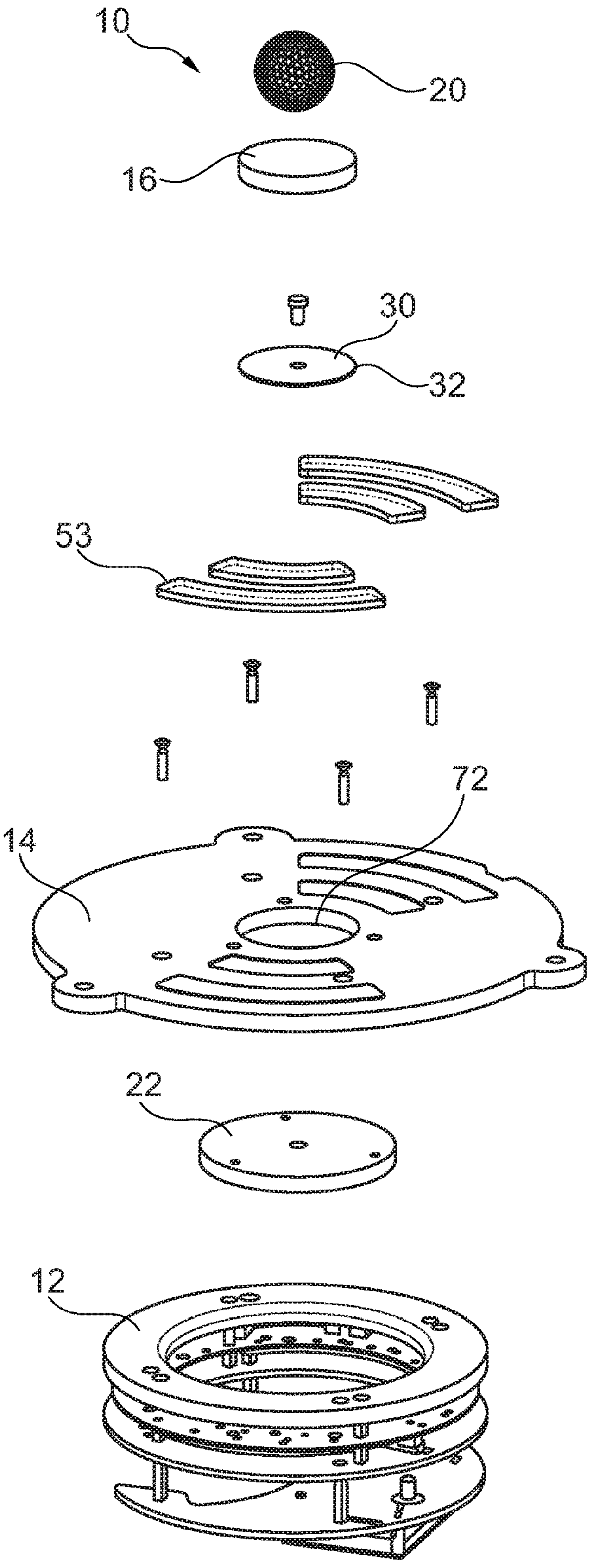
FIG. 1 is an exploded view of an apparatus in accordance with an embodiment of the present invention for detecting a golf ball.

Referring now to the drawings. FIG. 1 shows an exploded view of the apparatus 10 provided at the location of a golf tee of a golf facility beneath the playing surface 70 FIG. 6. The apparatus is configured to communicate with a golf ball 20 located thereabove. The ball 20 is a coded ball, preferably of the type disclosed in WO2013/156778, WO2017/006132 and WO2017/006133 and has an internal magnetometer serving as a compass device.

The apparatus 10 comprises a supporting frame member 12 housing a coil drive device 76 (FIG. 6) containing drive circuitry 40. Frame member 12 supports a base member 14 with a base support plate 22 in the form of a plastics disk under a coil PCB and located below a central hole 72 in base member 14. Arcuate clamping members 53 are held in place by assembly screws. A cover plate 16 carries marking to indicate where the golf ball 20 should be positioned.

Concentrically located around hole 72 is a generally planar and circular electromagnetic coil 30. Coil 30 is mounted on a support 32 and has lead wires 34, 36 connected to circuitry 40 for applying pulsed signals to the coil.

Figure 2:
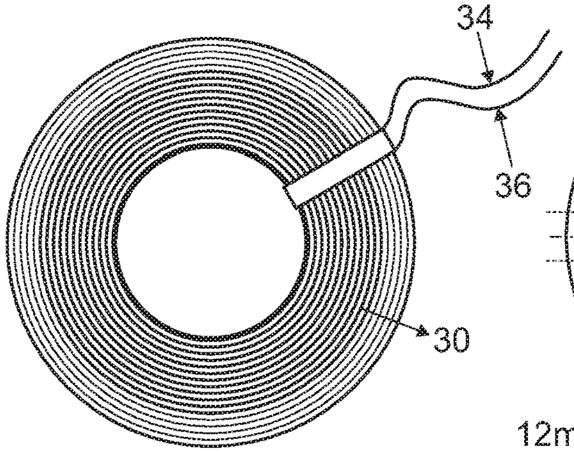
FIG. 2 is a top plan view of the coil of FIG. 1.

A top plan view of the coil 30 is shown in FIG. 2. The coil shown has an internal diameter of 30 mm and an outer diameter of 60 mm and typically has 245 turns. The pulsed signals are applied to the circuitry 40 via terminals 42, 44.

Figure 3:
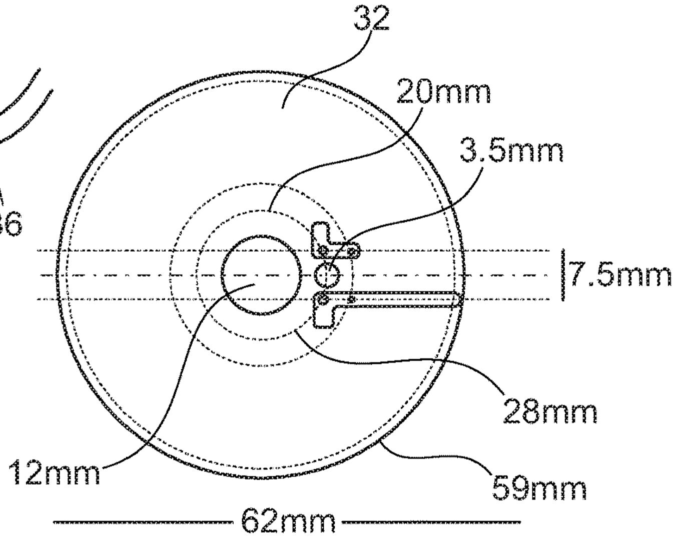
FIG. 3 is a bottom plan view of a support for the coil of FIG. 2.

A bottom plan view of the coil support 32 is shown in FIG. 3. Its preferred dimensions are given in millimetres.

Figure 4:
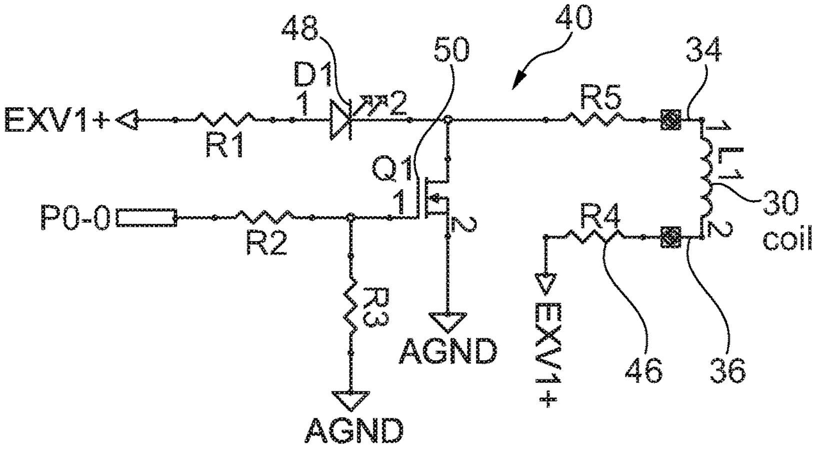
FIG. 4 is a circuit diagram of the apparatus.

There is illustrated in FIG. 4 circuitry 40 which is effectively a switching arrangement for feeding the pulses to coil 30. The circuitry also comprises a resistor 46, an indicating LED 48 and a MOFSET transistor 50. Resistor 46 is a ballast resistor used to avoid overloading of the switching transistor 50. The resistance value of the resistor 46, typically 20 ohms, is selected in combination with that of the coil 30, typically 13 ohms, to provide high magnetic fields while avoiding overheating.

Figure 5:
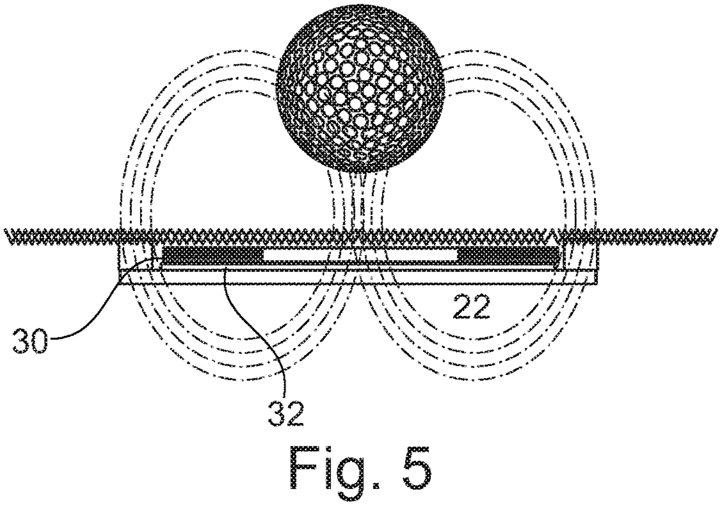
FIG. 5 is a representation of the magnetic field produced by the coil.

FIG. 5 shows the size and shape of magnetic field 60 produced by coil 30.

Figure 6:
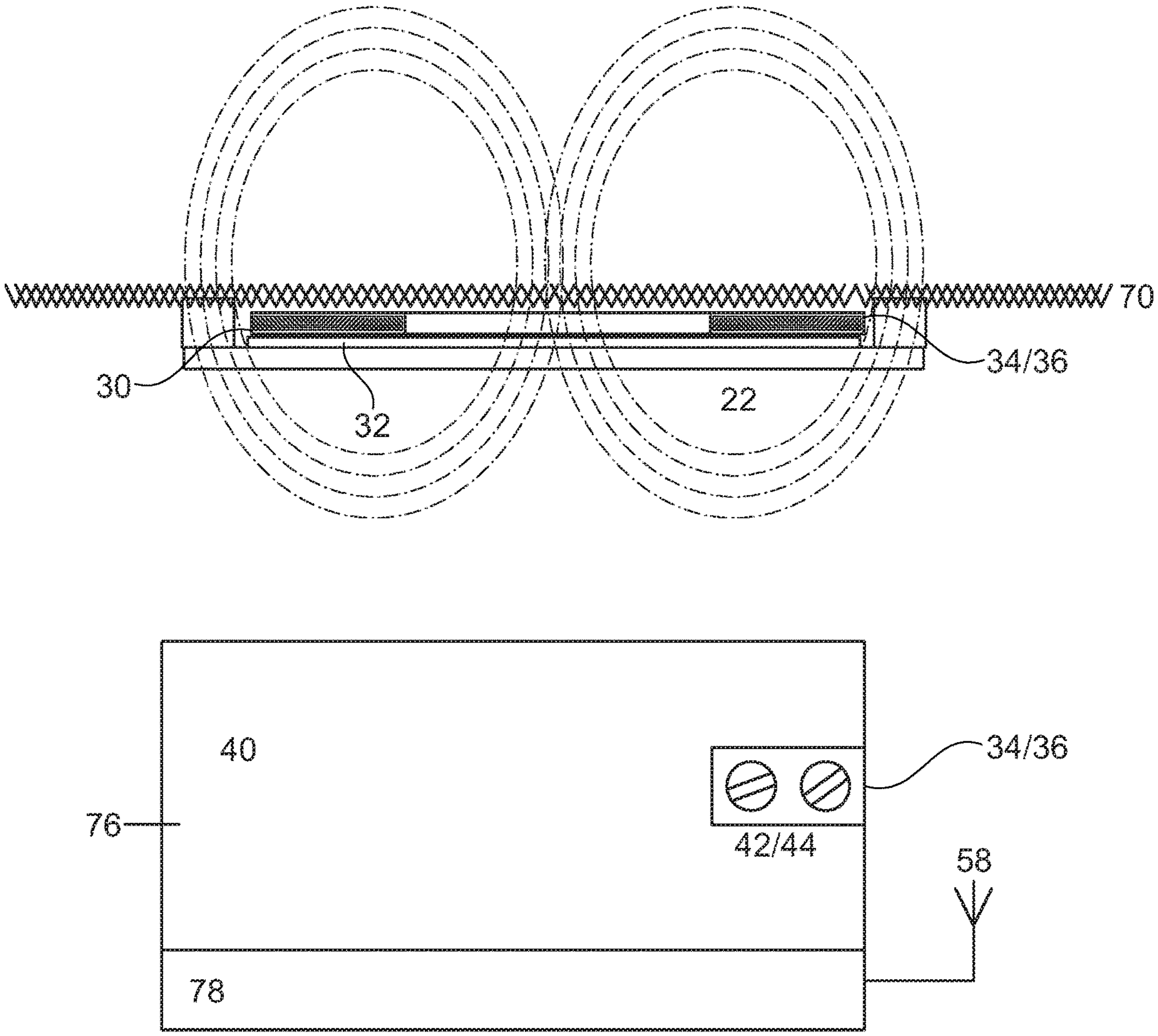
FIG. 6 shows the coil drive device of the apparatus.

FIG. 6 is a schematic representation of the coil drive device 76 illustrating its connection to coil 30. The device 76 comprises the circuitry 40, with terminals 42, 44, and a microcontroller 78 with an antenna 58 for r.f. communication (e.g. via Bluetooth) with a control system of the golf facility.

Figure 7:
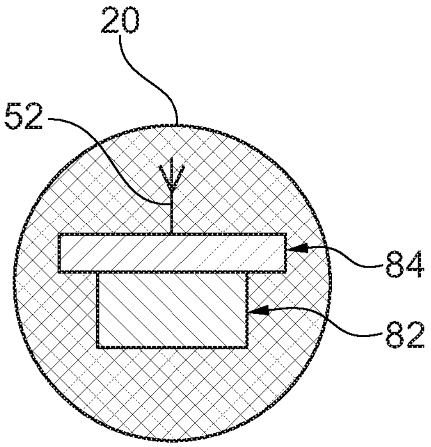
FIG. 7 is a schematic representation of a golf ball for use with the apparatus.

FIG. 7 is a schematic representation of a golf ball 20 for use with embodiments of the present invention. It comprises a magnetometer 82 connected to a microcontroller 84 and an antenna 52 for r.f. communications (e.g. via Bluetooth) with the control system of the golf facility.

Figure 8:
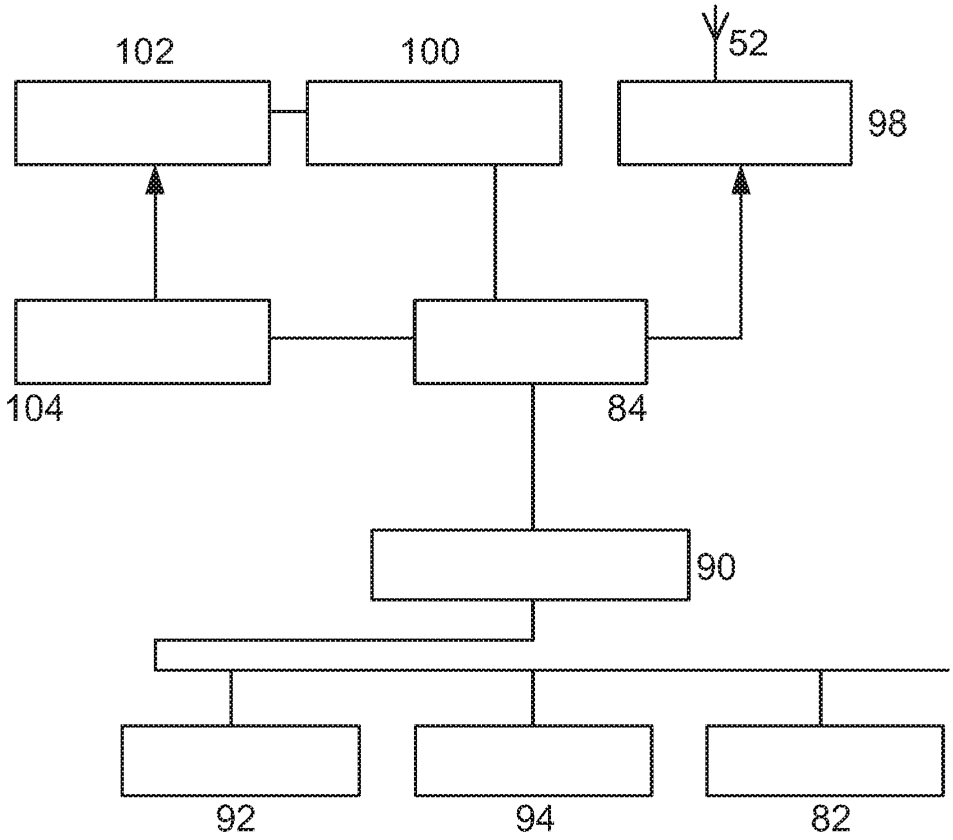
FIG. 8 is a block diagram showing the components within the golf ball.

FIG. 8 shows a more detailed schematic view of the components within ball 20. A communication bus 90 is connected to an accelerometer 92, a gyroscope 94 and the magnetometer 82. The bus 90 is also connected to the microcontroller 84 which is operatively connected to a radio 98 and a battery 100. The microcontroller 84 is also operatively connected to a charge system 102 and a back scatter feedback unit 104, which is used to feed back the charge status of the ball to the charger when the system is operating in charge mode. The feedback is achieved over the charge signal from the charge system.

The ball 20 is positioned by the configuration of the apparatus 10 so that there are no "dead spots" and that its magnetometer is exposed to the magnetic field. The amplitude of the signals applied to the coil is set so that only a ball in position on the tee has its magnetometer in communication with coil 30. In practice, a positioned ball can undergo a limited amount of movement without the signal being lost, but it is important that balls further away from the tee do not communicate with the coil 30. The magnetometer detects the presence of the magnetic field 60 as a change in the direction of north, and alters its output accordingly.

Located adjacent to tee apparatus 10 (but not shown in the Figures) is an antenna 58 for conducting radio communications (such as Bluetooth communications) with an antenna 52 within the ball and/or with a control system of the golf facility. These communications transfer a relatively large amount of data. In other applications, not employing an additional communication system, the antennas 52 and 58 can be omitted.

In use, the electromagnetic coil 30 is used to transmit a relatively small amount of data to a magnetometer within a ball 20 on the tee. The signals generated by the coil are approximately 80 Hz as determined by the data rate of the magnetometer.

The coil transmits messages containing 32 bits, namely:

3 data words of 4 bits each, giving 12 data bits in total
1 check word of 4 bits
6 preamble bits
10 framing bits, made up of 8 break bits and 2 End Of Frame bits The actual message depends on the identity of the apparatus 10 or tee concerned.

Figures 9, 10, 11, 12:
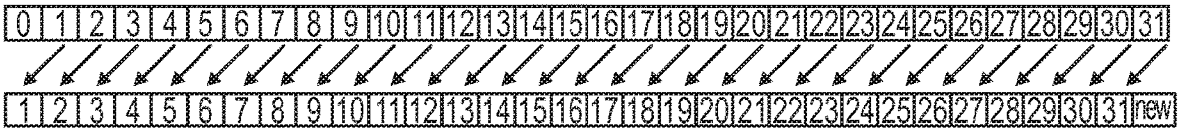
FIGS. 9 to 12 show messages sent by the coil to the ball.

An encoded message is shown in FIG. 9.

Each 4-bit data word is preceded by two break bits, which must be 0.

The preamble consists of six bits, alternating 0s and 1s, which are configured to deliberately not match the regular data pattern rule described above. This ensures that the start of the message can be detected reliably.

The check word represents the total count of the 1 bits contained in the data words. This is more reliable than using a simple XOR checksum. If a single transition is missed during the message, a simple XOR checksum would still pass, but this bit count would correctly fail.

The message ends with two End of Frame bits, which must be 1. This ensures that the end of the message can be detected reliably.

The message is transmitted by applying to the coil 30 to transmit a 1, which generates a magnetic field, and removing power to transmit a 0, which removes the magnetic field. Each bit is transmitted in turn, starting with the preamble, and finishing with the End Of Frame bits.

The message is repeated at slightly different frequencies around 80 Hz, to ensure that any magnetometer can detect and decode the message, even if it is not running at exactly 80 Hz. The actual data rate of the magnetometers generally employed in golf balls varies by as much as +/−10%.

Magnetometers are conveniently employed to determine the direction of the earth's magnetic field, and this is how they are used in balls in the golf facilities disclosed in the above-mentioned patent specifications. However, in the present system, magnetometers are used for near-field communication in addition to being used as compasses and are used to detect coded messages from individual tees. Thus the magnetometer within a ball monitors the strength of the magnetic field at a rate of approximately 80 Hz.

The polarity of the message cannot easily be determined, so the magnetometer can only compare each reading with the previous reading. If it detects a significant change, then this bit is the opposite of the previous bit. If there is no significant change, then this bit is the same as the previous bit. The polarity can be determined when the message is decoded.

After each bit is received, a 32-bit buffer is shifted left by 1 bit, and the new bit is added to the end of the message, see FIG. 10.

The buffer is built up in this way until at least 32 bits have been collected.

A message is received as follows. After each bit is received, the buffer is masked and compared against the preamble and framing bits, see FIG. 11.

If all of these bits match, then the system counts the number of 1s across all the data words. This total is compared against the check word, and if it matches, then the data are valid.

The buffer is also masked and compared against the inverse of the preamble and framing bits, see FIG. 12.

If all of these bits match, then the polarity of the message has been reversed. The entire buffer can now be inverted and the check word is checked as above.

If any of the bits do not match, then the system waits until the next bit is received.

When a message has been checked and verified, not only does the circuitry within the ball know that it is on a tee and should be switched "on" (or high), (this being equivalent to the closure of the magnetic switch in WO2017/006133) but also knows at which particular tee it is located (since each tee has its own unique code).

After finishing its communication process with coil 30, a magnetometer resumes its function of serving as a compass to monitor subsequent movements of the ball.

An advantage of the above described arrangement is that it provides more secure and reliable communications between individual golf balls and the rest of the golf facility. A further advantage is that the arrangement makes use of magnetometers which are already provided in the golf balls of such golf facilities. When being used for communications, their north-seeking function is temporarily suspended and is resumed after the communication function ceases.

Various modifications may be made to the above-described system. In addition to being used at tees, the apparatus 10 can be employed at various other locations in a golf facility for example in ball dispensers, in battery chargers for batteries within the balls, at a golf hazard, at a drop zone or at a cup serving as a golf hole. At tee locations, the coil 30 is preferably permanently switched on, either at a constant level or, more preferably, at one of a low- or high-power state. At other locations, e.g. at a ball dispenser, the coil 30 is preferably switched on only when required.

The golf ball does not need to be coded.

The apparatus can be employed generally for communicating with a magnetometer in other objects, whether coded or not, whether balls or not, and whether employed in games or not.

A compass device of another type may be used instead of a magnetometer.

The invention claimed is:

1. A golf facility comprising:
- a plurality of tee apparatus each of which includes:
  - a support;
  - an electromagnetic coil that is mounted on the support and transmits a unique identification code by generating a changing magnetic field;
  - a cover plate that carries a marking for ball positioning; and
  - circuitry that supplies electrical signals to the electromagnetic coil to generate the changing magnetic field; and
- a golf ball including:
  - a magnetometer that:
    - receives the unique identification code of one of the plurality of tee apparatus by detecting the changing magnetic field of the electromagnetic coil;
    - transitions from a low-power state to a high-power state upon detection of the changing magnetic field of one of the plurality of tee apparatus; and
    - upon receipt of the unique identification code, subsequently serves as a compass to monitor movement of the golf ball; and
  - circuitry that identifies at which of the plurality of tee apparatus the golf ball is located based on the unique identification code.

2. A golf facility according to claim 1, wherein the circuitry of each of the plurality of tee apparatus supplies pulsed signals that are coded with the unique identification code to the electromagnetic coil.

3. A golf facility according to claim 1, wherein the circuitry of each of the plurality of tee apparatus supplies successive messages over a predetermined range of frequencies.

4. A golf facility according to claim 3, wherein a data rate of the magnetometer varies by as much as plus or minus 10%.

5. A golf facility according to claim 1, wherein the golf ball includes a radio signal transmitter and each of the plurality of tee apparatus includes a radio signal receiver, wherein the radio signal transmitter transmits, by a radio signal, an identification code that is unique to the golf ball to the radio signal receiver of a respective one of the plurality of tee apparatus at which the golf ball is positioned.

6. A golf facility according to claim 1, wherein each of the plurality of tee apparatus further includes a frame member that houses the circuitry.

7. A golf facility according to claim 6, wherein each of the plurality of tee apparatus further includes:
- a base member supported by the frame member and defining a central hole; and
- a base support plate located below the central hole of the base member.

8. A golf facility according to claim 1, wherein the golf ball includes a radio signal transmitter that is activated when the circuitry of the golf ball transitions to the high-power state and transmits a signal including an identification code unique to the golf ball, and wherein each of the plurality of tee apparatus further includes a radio signal receiver that receives the signal including the identification code unique from the golf ball.

9. A golf system comprising:
- a tee apparatus that includes:
  - a support;
  - an electromagnetic coil mounted on the support and configured to transmit a unique identification code by generating a changing magnetic field;
  - a marking for ball positioning; and
  - circuitry configured to supply electrical signals to the electromagnetic coil to generate the changing magnetic field; and
- a golf ball including:
  - a magnetometer configured to:
    - receive the unique identification code of the tee apparatus by detecting the changing magnetic field of the electromagnetic coil;
    - transition from a low-power state to a high-power state upon detection of the changing magnetic field of the tee apparatus; and
    - upon receipt of the unique identification code, subsequently serve as a compass to monitor movement of the golf ball; and
  - circuitry configured to identify when the golf ball is located at the tee apparatus based on the unique identification code.

10. A golf facility according to claim 9, wherein the golf ball includes a radio signal transmitter that is configured to activate when the circuitry of the golf ball transitions to the high-power state and transmit a signal including an identification code unique to the golf ball, and wherein the tee apparatus further includes a radio signal receiver configured to receive the signal that includes the identification code unique from the golf ball.

11. A golf system according to claim 9, wherein the circuitry of the tee apparatus is configured to supply pulsed signals that are coded with the unique identification code to the electromagnetic coil.

12. A golf system according to claim 9, wherein the circuitry of the tee apparatus is configured to supply successive messages over a predetermined range of frequencies.

13. A golf facility according to claim 12, wherein a data rate of the magnetometer is configured to vary by as much as plus or minus 10%.

14. A golf system according to claim 9, wherein the golf ball includes a radio signal transmitter and the tee apparatus includes a radio signal receiver, wherein the radio signal transmitter is configured to transmit, by a radio signal, an identification code that is unique to the golf ball to the radio signal receiver of the tee apparatus at which the golf ball is positioned.

15. A golf system comprising:
- a tee apparatus that includes:
  - a support;
  - an electromagnetic coil mounted on the support and configured to transmit a unique identification code by generating a changing magnetic field;
  - a marking for ball positioning;
  - circuitry configured to supply electrical signals to the electromagnetic coil to generate the changing magnetic field; and
  - a frame member that houses the circuitry; and
- a golf ball including:
  - a magnetometer configured to:
    - receive the unique identification code of the tee apparatus by detecting the changing magnetic field of the electromagnetic coil; and
    - upon receipt of the unique identification code, subsequently serve as a compass to monitor movement of the golf ball; and
  - circuitry configured to identify when the golf ball is located at the tee apparatus based on the unique identification code.

16. A golf system according to claim 15, wherein the tee apparatus further includes:
- a base member supported by the frame member and defining a central hole; and
- a base support plate located below the central hole of the base member.

17. A golf facility according to claim 15, wherein the circuitry of the tee apparatus is configured to supply pulsed signals that are coded with the unique identification code to the electromagnetic coil.

18. A golf facility according to claim 15, wherein the circuitry of the tee apparatus is configured to supply successive messages over a predetermined range of frequencies.

* * * * *